United States Patent Office 3,423,692
Patented Jan. 21, 1969

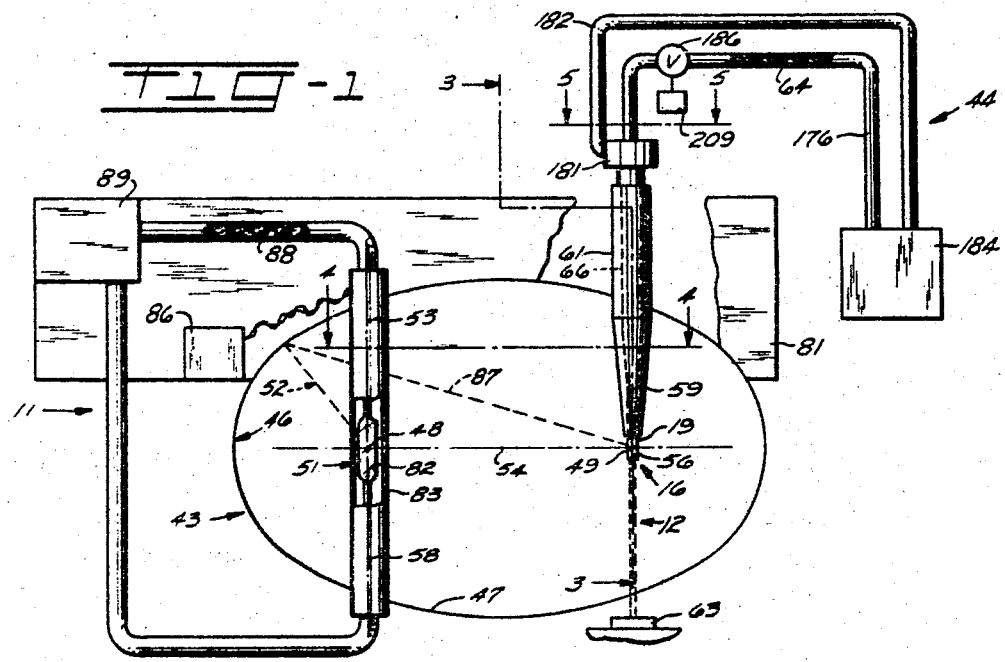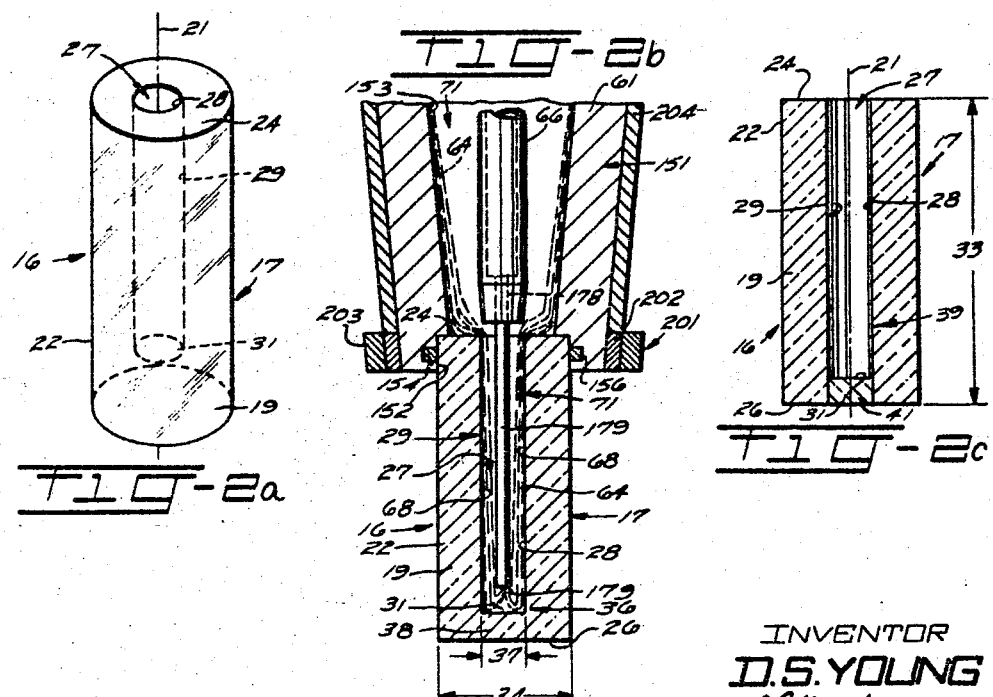

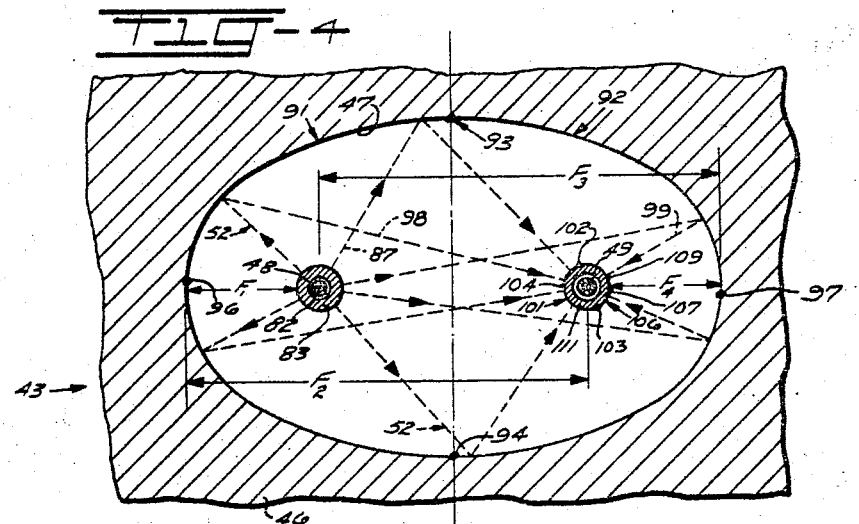
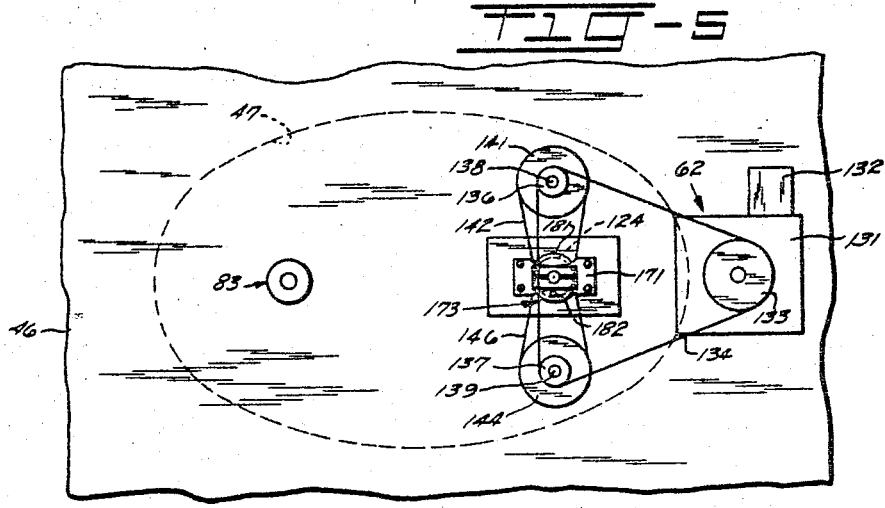
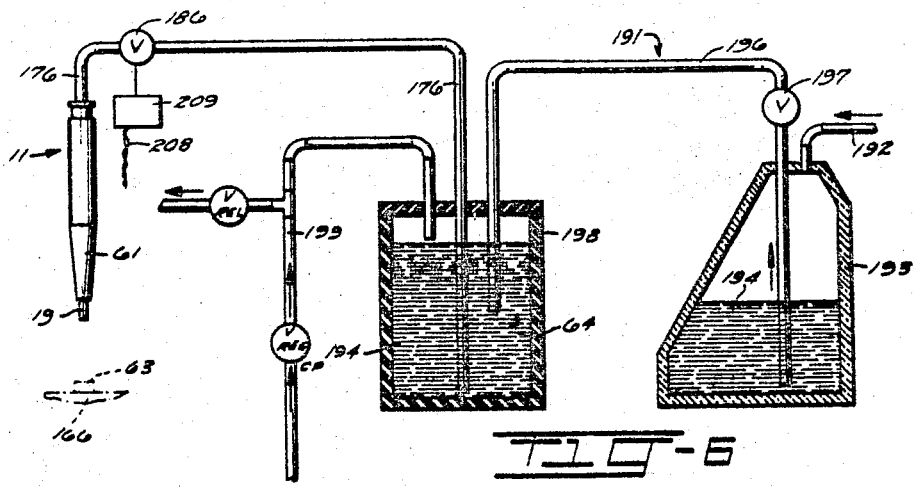

3,423,692
METHOD OF AND APPARATUS FOR COOLING A LASER CRYSTAL AND/OR PRECLUDING PREFERENTIAL LASING
Donald Sanford Young, Flemington, N.J., assignor to Western Electric Company, Incorporated, New York, N.Y., a corporation of New York
Filed Oct. 7, 1963, Ser. No. 314,237
U.S. Cl. 331—94.5    14 Claims
Int. Cl. H01s 3/04

ABSTRACT OF THE DISCLOSURE

A selected portion of a laser element is exposed to pumping radiation and the laser element is rotated to uniformly expose the outer area of the laser element to the pumping radiation to preclude preferential lasing. In addition, the laser element may be provided with an internal bore into which bore a coolant is introduced so that rotation of the laser element urges the coolant against the surface of the bore and flows the coolant along the surface to extract heat from the laser element. Also, the bore in the laser element may be a blind bore to facilitate the flow of the coolant against the surface of the bore upon rotation of the laser element.

Background of the invention

This invention relates to laser devices, and more particularly to methods of and apparatus for maintaining a solid-state optical resonator at a selected operating temperature without interfering with optical pumping of the resonator.

To effect laser operation, i.e., light amplification by stimulated emission of radiation, of solid-state optical resonators, high-intensity light is used to provide optical pumping radiation for stimulating or optically pumping the resonators. More particularly, to effect population inversions attendant laser operation of solid-state optical resonators such as ruby crystals, the resonators are illuminated with high-intensity light generated by mercury arc or xenon flash lamps, for example.

The efficiency of a solid-state optical resonator may be defined by the ratio of the output power of the radiation emitted by the resonator to the input power of the optical pumping radiation applied to the crystal. The efficiency of such resonators is known to be relatively low. Accordingly, efforts have been made in the past to develop sources of extremely high-power optical pumping radiation, which sources were intended to compensate for the low efficiency and permit higher output power. Such high-power optical pumping radiation sources are limited to pulsed operation and, hence, are not suitable for industrial applications requiring continuous wave laser output. Additionally, the high power required for such optical pumping radiation sources precludes use thereof for many industrial purposes. Furthermore, increased power input to such optical pumping radiation sources places extreme burdens on facilities for maintaining the resonator at a low operating temperature.

The efficiency of many solid-state optical resonators increases as the operating temperature of the resonators decreases to an optimum operating temperature. Accordingly, it has been common to enclose a solid-state optical resonator in a container such as a glass tube and flow a cool liquid through the tube so that the outer surface of the resonator contacts the cool liquid. In the use of such cooling apparatus, however, problems have been encountered in flowing the cool liquid with sufficient velocity to prevent the formation of bubbles on the outer surface of the enclosed resonator. The bubbles eliminate thermal contact of the outer surface of the resonator with the cool liquid, which decreases the heat transfer to the liquid enough in some cases to permit the resonator to melt. Additionally, advantages gained by cooling the resonator in this manner are significantly offset because a substantial amount of the power of the optical pumping radiation is lost during transmission of the radiation through the walls of the glass tube. Further, the walls of the glass tube reflect portions of the optical pumping radiation, lowering the power of the radiation that may be transmitted to the optical resonator.

Research resulting in facilities and methods of the present invention for maintaining a solid-state optical resonator at a predetermined operating temperature without interfering with the optical pumping of the resonator, indicates that modification of standard optical resonator configurations such as rods, spheres, or wafers having an axis of symmetry, to provide a hollow or cavity within the resonator, permits introduction of a liquid coolant into the resonator. Concomitant with such introduction of the coolant, rotation of the resonator on the axis of symmetry centrifugally urges the coolant into contact with the wall of the cavity to transfer heat from the resonator and maintain the resonator at a predetermined operating temperature. The heated liquid coolant is centrifugally urged out of the cavity to remove the heat transferred from the resonator.

With the coolant within the resonator, rather than being between the source of optical pumping radiation and the resonator, the coolant does not diminish the power of the optical pumping radiation applied to the outer surface of the resonator, rendering greater efficiency possible. Moreover, the rotation of the optical resonator exposes the entire surface of the resonator to the optical pumping radiation. Such exposure tends to equalize the average flux density of the optical pumping radiation applied to various areas of the outer surface of the optical resonator, precluding preferential laser operation which may occur when the optical pumping radiation is not uniformly applied to the outer surface of the resonator. With preferential laser operation of the optical resonator precluded, increased efficiency may be obtained. Further, high coolant flow rates within the cavity result from rotation of the resonator and lessen the probability of forming coolant bubbles. If, however, coolant bubbles are formed during the heat transfer to the liquid coolant, the bubbles are urged to the inside of the cavity and away from the liquid coolant-cavity wall interface when the liquid coolant, which has a greater density than the bubbles, is forced centrifugally against the cavity wall. The bubbles are, thus, precluded from interfering with the heat transfer process.

An object of this invention is to provide new and improved laser devices.

Another object of the present invention is the provision of methods of and apparatus for maintaining a solid-state optical resonator at a selected operating temperature without interfering with optical pumping of the resonator.

Still another object of this invention is to provide an improved optical resonator having a configuration which permits introduction of a coolant into the interior of the optical resonator for maintaining the resonator at a selected operating temperature without interfering with optical pumping thereof.

A further object of the present invention resides in the provision of facilities for turning an optical resonator having a cavity formed therein on an axis of symmetry thereof to urge a coolant material against the surface of the cavity and maintain the optical resonator at a predetermined operating temperature.

A still further object of the present invention resides in the provision of facilities for turning a solid-state optical resonator on an axis of symmetry thereof to preclude preferential laser operation of the optical resonator.

An additional object of the present invention resides in the provision of a reflector having an elliptical reflective surface in conjunction with facilities for rotating an optical resonator on an axis coincident to a first focal line of the reflector for uniformly exposing the optical resonator to optical pumping radiation generated by a source located along a second focal line of the reflector.

Summary of the invention

With these and other objects in view, the present invention contemplates provision of an improved, solid-state, optical resonator, such as an optical maser or laser element having an axis of symmetry and a cavity formed therein symmetrically with the axis of symmetry.

The present invention further contemplates a method of maintaining the improved, solid-state, optical resonator at a predetermined operating temperature in which optical pumping radiation is focused onto a focal line coincident with the axis of symmetry of the optical resonator. A coolant is introduced into the cavity of the optical resonator, whereafter the optical resonator is rotated about the axis of symmetry to uniformly expose the outer surface thereof to the focused optical pumping radiation to preclude preferential laser operation of the optical resonator and to centrifugally urge the coolant along the wall of the cavity to transfer heat from the optical resonator and maintain the optical resonator at a predetermined operating temperature.

Apparatus constructed in accordance with the present invention for performing the above-described method may include facilities for optically pumping the optical resonator to cause the optical resonator to emit a beam of selected light radiation. A coolant supply facility establishes a temperature differential across the wall of the cavity and a coolant received in the cavity and contacting the wall to cool the optical resonator. When the coolant is a fluid, such as a liquid coolant, the coolant is urged against the wall of the cavity and flows out of the cavity upon operation of facilities for turning the resonator on the axis. As the resonator turns on the axis, the optical pumping facilities are effective to uniformly excite the optical resonator and eliminate preferential laser operation thereof.

A complete understanding of this invention may be had by referring to the following detailed description and the accompanying drawings illustrating a preferred embodiment thereof in which:

Brief description of the drawings

FIG. 1 is an elevational view of a laser device illustrating a source of optical pumping radiation mounted at a first focal point of an elliptical reflector for stimulating an optical resonator of the present invention according to the principles of the present invention;

FIGS. 2a, 2b and 2c illustrate two embodiments of the optical resonator of the present invention showing an axis of symmetry of the resonator and a cavity formed symmetrically with respect to the axis of symmetry for receiving coolant;

FIG. 4 is a sectional view of the reflector taken along line 4—4 of FIG. 1 illustrating the operation of the reflector for focusing optical pumping radiation onto the rotating optical resonator;

FIG. 5 is a plan view taken along the line 5—5 of FIG. 1 showing a drive mechanism for rotating the spindle; and FIG. 6 is a schematic view of a coolant supply device for feeding coolant to the cavity of the optical resonator.

Detailed description

Figure 3:
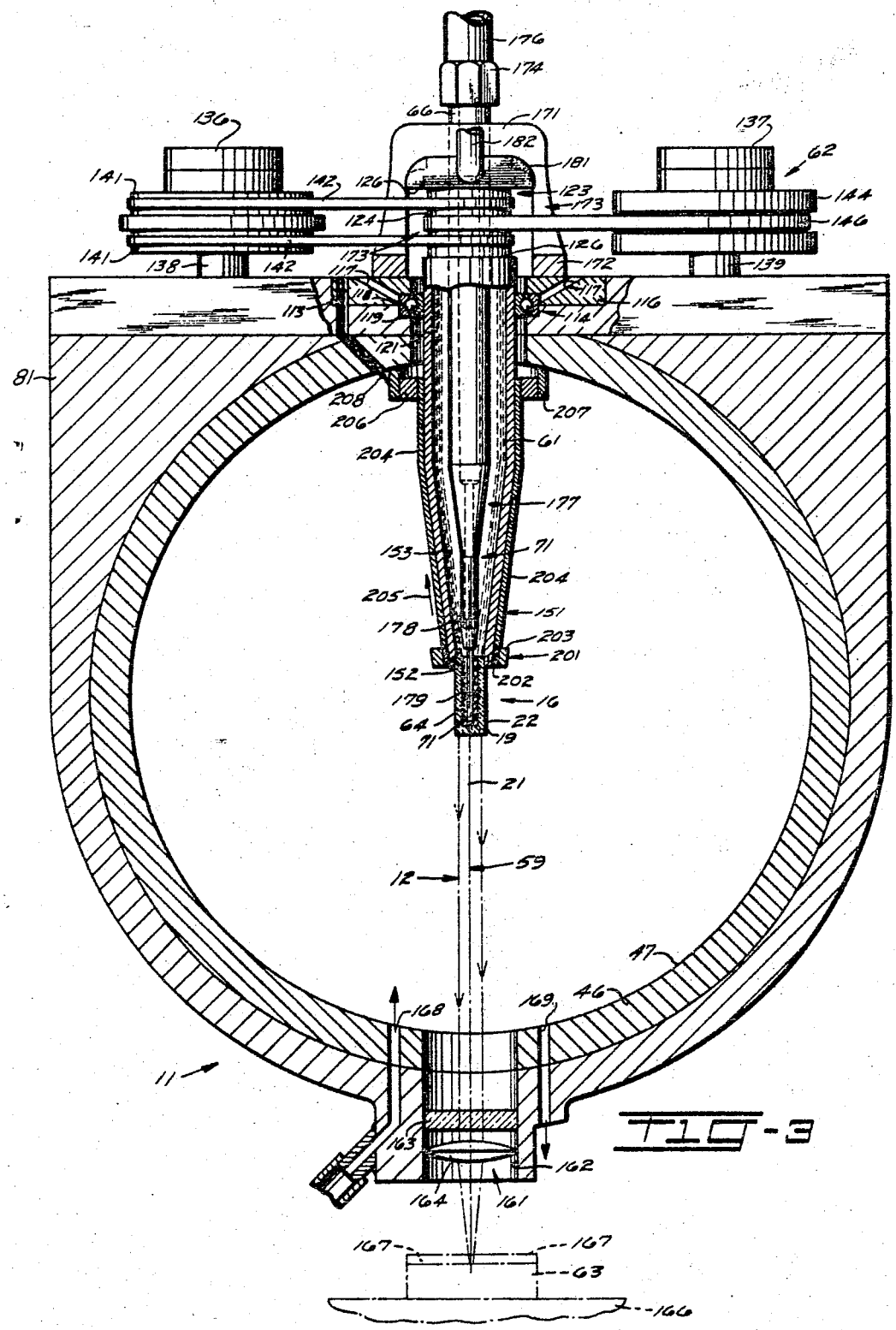
FIG. 3 is a partially sectioned elevational view taken along the line 3—3 in FIG. 1 illustrating a conduit for supplying coolant into the cavity of the optical resonator and a rotary spindle mounting the optical resonator for rotation to urge the coolant out of the cavity and transfer heat from the optical resonator.

Referring now in detail to the drawings, there is shown in FIG. 1 a laser device 11 for generating a beam 12 of selected light radiation, such as a beam of coherent, monochromatic light, according to the principles of the present invention. The laser device 11 includes an improved, solid-state, optical resonator 16 such as an optical maser or laser element 17 shown in FIGS. 2a through 2c. The optical resonator 16 is fabricated from a solid-state material which is capable of laser operation, i.e., a material which, when operating in a laser condition, is capable of light amplification by stimulated emission of radiation. Such solid-state material consists of an active ion having electrons in a partly filled shell which can be excited into higher energy states by the absorption of energy. The material is adapted to re-emit part of the absorbed energy in the form of the beam 12 of light, producing fluorescence at a selected wavelength. Solid-state materials capable of laser operation include: (1) ruby comprising the crystalline material aluminum oxide ($Al_2O_3$) having active chromium ions ($Cr^{3+}$), (2) fluorite ($CaF_2$) having active ions such as uranium ($U^{3+}$) or neodymium ($Nd^{3+}$), and (3) scheelite ($CaWO^4$) having active ions such as neodymium ($Nd^{3+}$). Other suitable solid-state laser materials will be apparent to those skilled in the art.

Optical resonator

The improved, solid-state, optical resonator 16 may be fabricated from a single laser crystal 19 (FIGS. 2a through 2c) of solid-state material capable of laser operation. The laser crystal 19 is provided with an axis of symmetry 21 and an outer surface 22 formed symmetrically with respect to the axis of symmetry 21. The laser crystal 19 is also provided with spaced or opposed, first and second end surfaces 24 and 26, respectively, which define the length of the laser crystal 19 in the direction of the axis of symmetry 21. According to the principles of the present invention, a cavity 27 is formed through the first end surface 24 and extends partially through the laser crystal 19 symmetrically with respect to the axis of symmetry 21. The cavity 27 is provided with a wall 28 forming an inner surface 29 of the laser crystal 19 and a bottom 31.

The present invention is illustrated as shown in FIGS. 2a and 2b with reference to the laser crystal 19 provided with a rod-shaped or cylindrical configuration having the outer surface 22 formed symmetrically with respect to the axis of symmetry 21 and fabricated from solid-state material such as ruby, which is capable of laser operation. The present invention is also applicable to such crystals as spherical and wafer shaped crystals (not shown) which also have an axis of symmetry. The laser crystal 19 is provided with the opposed first and second end surfaces 24 and 26, respectively, which are coated with a reflective, dielectric material so that the end surface 24 is totally reflective and the end surface 26 is partially reflective. The end surfaces 24 and 26 are formed in a standard manner to be flat within one-tenth of a wavelength of sodium light, for example, and parallel to six seconds, for example. Additionally, the laser crystal 19 may be provided with a zero degree orientation and a crystalline axis that is parallel to the axis of symmetry 21. The first and second end surfaces 24 and 26, respectively, may be spaced by a suitable distance, such as one inch, to define a one-inch length 33 of the outer surface 22 of the laser crystal 19 measured in the direction of the axis of symmetry 21. A suitable diameter 34 for the outer surface 22 of the laser crystal 19 is three-eighths of an inch when the length 33 is one inch.

According to the principles of the present invention, the cavity 27 is provided in the laser crystal 19 as a blind bore 36 having a selected diameter 37, such as one-eighth of an inch, and formed through the first end surface 24 symmetrically with respect to the axis of symmetry 21. The blind bore 36 extends into the laser crystal 19 and to the bottom 31 so that a thin section 38 of the laser crystal 19 remains between the bottom 31 and the second end surface 26 to render the bore 36 blind, as distinguished from being a through bore 39 formed completely through the laser crystal 19 in the manner shown in FIG. 2c.

Referring to FIG. 2c, the through bore 39 is formed completely through the laser crystal 19 and a plug 41 of material, such as sapphire, is provided for forming the thin section 38 to render the through bore 39 blind.

Laser device

Attention is now directed to FIG. 1 where the laser crystal 19 is shown mounted within a reflector 43 for laser operation. The laser crystal 19 is connected to a coolant supply device 44 which maintains the laser crystal 19 at a predetermined operating temperature during the laser operation. The reflector 43 includes an enclosure 46 provided with an inner, reflective surface 47 and formed in the configuration of an ellipsoid of revolution having a first focal point 48 spaced from a second focal point 49. A source 51 of optical pumping radiation 52 is mounted at the first focal point 48 along a line 53 that is perpendicular to a line 54 extending between the first and second focal points 48 and 49, respectively. The source 51 generates the high-intensity optical pumping radiation 52 which is focused by the reflective surface 47 at the second focal point 49 in the form of a line 56 of reflected light that extends the full length of the laser crystal 19. With the optical pumping radiation 52 generated along the line 53 and reflected in the form of the line 56, the focal points 48 and 49 may be referred to as focal lines 58 and 59, respectively, which extend through the focal points 48 and 49 and are perpendicular to the line 54.

A spindle 61 mounts the laser crystal 19 within the reflector 43 with the axis of symmetry 21 coincident to the focal line 59. The spindle 61 is rotated by a drive mechanism 62 for turning the laser crystal 19 on the axis of symmetry 21 to uniformly expose the outer surface 22 of the laser crystal 19 to the optical pumping radiation 52 so that the laser crystal 19 is optically pumped and rendered effective to generate the beam 12 of coherent light. The beam 12 of coherent light is focused onto an article 63 mounted in alignment with the second focal line 59 for processing the article.

The coolant supply device 44 feeds fluid coolant 64 (see FIG. 2b) to a conduit 66 extending through the spindle 61 into the blind bore 36 of the laser crystal 19. The conduit 66 supplies the fluid coolant 64 to the bottom 31 of the blind bore 36 where the rotation of the laser crystal 19 is effective to flow the fluid coolant 64 outwardly into contact with the inner surface 29 and upwardly out of the blind bore 36. As the fluid coolant 64 flows outwardly and then upwardly, heat generated during laser operation of the laser crystal 19 is transferred from the laser crystal 19 to the fluid coolant 64. The speed of rotation of the laser crystal 19 and the flow rate of fluid coolant 64 into the conduit 66 may be selected to provide a selected fluid coolant flow rate out of the blind bore 36 so that the temperature of the fluid coolant at the fluid coolant-inner surface interface 68 (FIG. 2b) is insufficient to cause boiling of the fluid coolant 64 and conversion thereof to the gaseous state. In practice, the spindle 61 acts as a heat sink for transferring heat from the laser crystal 19 to the fluid coolant 64 as the fluid coolant flows upwardly from the blind bore 36 through an annular passageway 71 between both the spindle 61 and the conduit 66 and the inner surface 29 and the conduit 66.

Turning now to the structural details of the above-described apparatus, the laser device 11 is shown in FIG. 1 including a frame 81 provided for supporting the enclosure 46 with the line 54 between the focal points 48 and 49 generally horizontal. The inner, reflective surface 47 may be plated with a reflective material having a reflective spectra corresponding to the absorption spectra of the laser crystal 19. For example, the plating material may be aluminum for maximum reflectivity of the optical pumping radiation 52 from the source 51 when the laser crystal is fabricated from ruby.

When it is desired to generate a continuous beam 12 of coherent light from the laser crystal 19, the source 51 may be a mercury arc lamp, for example, having a continuous output of optical pumping radiation 52. Alternatively, when a pulsed beam 12 of coherent light is desired, the source 51 may be a standard xenon flash lamp 82, for example, which produces pulsed optical pumping radiation 52. Reference will be made to the lamp 82 for purposes of describing the present invention, it being understood that the mercury arc lamp may be used instead of the lamp 82 as described above.

The lamp 82 is mounted within a water jacket 83 and positioned so that a central axis thereof is coincident to the focal line 58 of the reflector 43. An electrical power supply 86 provides an input signal for rendering the lamp 82 effective to generate the optical pumping radiation 52 in the form of pulses of light 87 having an intensity, when focused onto the laser crystal 19 by the inner reflective surface 47, sufficient to render the laser crystal 19 effective for laser operation. Cooled water 88 is supplied from a cooled water supply 89 to the water jacket 83 to provide necessary cooling of the lamp 82.

As shown in FIG. 4, the inner reflective surface 47 of the reflector 43 is provided with first and second halves 91 and 92, respectively. The first half 91 extends between points 93 and 94 via point 96; whereas, the second half extends between the points 93 and 94 via the point 97. It may be understood that because the inner reflective surface 47 of the enclosure 46 is formed in the configuration of an ellipsoid of revolution, light 98 that is reflected by the first half 91 of the inner reflective surface 47 toward the laser crystal 19 has a flux density when applied to the laser crystal that differs from that of light 99 reflected by the second half 92 of the inner reflective surface. This follows from the fact that the magnification or ratio of $F_2$ to $F_1$ of the first section 91 is greater than unity; whereas, the magnification or ratio $F_4$ to $F_3$ of the second section 92 is less than unity.

When the laser crystal 19 is not rotating, a first area 101 extending between points 102 and 103 via point 104, and a second area 106 extending between points 102 and 103 via point 107, of the laser crystal 19 receive different flux densities of illumination where the flux density is defined in terms of the light flux received per unit area of outer surface 22. For example, the second area 107 of the laser crystal 19 is, therefore, preferentially pumped or stimulated because the flux density of illumination thereon is greater than that of the first area 101. Such preferential stimulation causes preferential laser operation of the laser crystal 19 so that a first section 109 of the laser crystal 19 adjacent to the second area 106, generates coherent light having a higher power level than that generated by a second section 111 of the laser crystal 19, adjacent to the first area 101.

When the laser crystal 19 is rotated on the axis of symmetry 21 at a selected speed of rotation, the light 98 and 99 reflected from the first and second halves 91 and 92, respectively, is alternately applied to the first and second areas 101 and 106, respectively, of the laser crystal 19 which then receive the same average flux density of optical pumping radiation during each revolution of the laser crystal 19. With the same average flux density of optical pumping radiation 52 received by the first and second areas 101 and 106, respectively, preferential lasing is prevented, rendering substantially all of the laser crystal 19 capable of laser operation and significantly increasing the efficiency and, hence, the power level of the beam 12 of coherent light for a given input of optical pumping radiation applied to the laser crystal 19.

Referring to FIG. 3, the frame 81 is shown provided with a stepped aperture 113 for receiving a ball bearing 114 mounted coaxially of the second focal line 59. A retaining ring 116 mounted in the stepped aperture 113 secures the ball bearing 114 therein and is provided with a pair of interconnected bores 117—117 for supplying gas heated to 200° C., for example, to an outer race 118 of the ball bearing 114 to preclude freezing thereof during operation of the laser device 11.

A central portion 121 of the spindle 61 is mounted on an inner race 119 of the ball bearing 114 for rotation coaxially of the second focal line 59. The spindle 61 is hollow and forms the passageway 71 upon reception of the conduit 66. The outer surface of an upper end 123 of the spindle 61 is machined to a smaller diameter than the remainder of the upper end to form a hub 124 defined by spaced rim surfaces 126. Alternatively, a hub-shaped annular member (not shown) may be pressed over the upper end 123 to form the hub 124.

The drive mechanism 62 is provided for rotating the hub 124 and the spindle 61. As shown in FIG. 5, the drive mechanism 62 includes a motor 131 that is controlled by a standard, variable-output power supply 132. The motor 131 may be of the high-speed type designed to drive a stepped pulley 133 at a maximum speed of ten thousand revolutions per minute (r.p.m.). The stepped pulley 133 drives a main drive belt 134 that is mounted between spaced auxiliary pulleys 136 and 137 mounted on spaced shafts 138 and 139, respectively, which are journaled in the frame 81. A pair of crowned pulleys 141—141 are keyed to the shaft 138 for driving spaced, spindle drive belts 142—142 which extend around the crowned pulleys 141—141 and the hub 124 of the spindle 61. Another crowned pulley 144 mounted on the shaft 139 drives a spindle drive belt 146 that extends around the crowned pulley 144 and the hub 124 between the spaced belts 142—142. The diameters of the stepped pulley 133, the auxiliary pulleys 136 and 137, the crowned pulleys 141—141 and 144, and the hub 124 are selected to achieved a 5:1 speed ratio with the motor 131 so that the spindle 61 may be rotated at speeds up to fifty thousand r.p.m.

As shown in detail in FIG. 2b, the lower end 151 of the spindle 61 is provided with an opening 152 communicating with a hollow, interior surface 153 of the spindle 61. The diameter of the opening 152 corresponds to the outside diameter 34 of the laser crystal 19. It may be understood that when the laser crystal 19 is inserted into the opening 152 at room temperature, a slight press fit exists. As the laser crystal 19 is cooled by the fluid coolant 64 to a predetermined operating temperature, the spindle 61 contracts more than the laser crystal 19, and causes the surface of the opening 152 to securely grip the laser crystal 19 so that the laser crystal is held by and rotates with the spindle 61.

Between the hollow, interior surface 153 of the spindle 61 and the opening 152, an annular recess 154 is provided in the spindle 61 for receiving a ring seal 156 fabricated from polytetrafluoroethylene material, such as that sold under the trademark "Teflon." The inner diameter of the ring seal 156 is less than the outer diameter 34 of the laser crystal 19 so that a tight seal is effected between the ring seal 156 and the laser crystal 19 when the laser crystal 19 is fully received within the opening 152.

The laser crystal 19 is in this manner mounted coaxially of the second focal line 59 for stimulation by the source 51 of optical pumping radiation 52 to generate the beam 12 of coherent light. As shown in FIG. 3, the beam 12 of coherent light is directed from the laser crystal 19 along the second focal line 59 toward a window 161 formed by an aperture 162 in the enclosure 46 provided coaxially of the second focal line 59. A disc 163 of material that is transparent to the beam 12 of coherent light is received in the aperture 162 for sealing the enclosure 46 against passage of fluids into or out of the enclosure. A lens 164 also received in the aperture 162 focuses the beam 12 of coherent light onto the article 63 that is positioned in alignment with the second focal line 59 by a support, such as a conveyor 166. The focused beam 12 of coherent light processes the article 63 such as by welding together a pair of plates 167—167 mounted on the article 63.

Adjacent to the aperture 162, first and second bores 168 and 169, respectively, are formed through the enclosure 46 and the frame 81. Through the first bore 168, a dry gas is supplied for maintaining within the enclosure 46 an atmosphere which prevents the formation of frost on the outer surface 22 of the laser crystal 19. The second bore 169 is provided to exhaust the dry gas to the atmosphere surrounding the frame 81.

Because of the relatively low efficiency of laser crystals in general, a considerable amount of heat is generated by the laser crystal 19 in response to the stimulation of the optical pumping radiation 52. To effect transfer of the heat from the laser crystal 19, the coolant supply device 44 (FIG. 1) feeds the fluid coolant 64 to the conduit 66 which, it will be recalled, extends through the spindle 61. As shown in FIG. 3, the conduit 66 is clamped to a generally bell-shaped housing 171 provided with a flange 172 secured to the retaining ring 116 for positioning the conduit 66 coaxially of the second focal line 59 within the spindle 61. Cutout sections 173—173 are provided in opposite sides of the housing 171 to provide clearance for the spindle drive belts 142—142 and 146 which extend from the crowned pulleys 141—141 and 144, respectively, around the hub 124. A fluid coupler 174 is secured to the end of the conduit 66 to connect the conduit 66 to a coolant supply pipe 176 of the coolant supply device 44. An end 177 of the conduit 66 which extends through the spindle 61 is shown tapered in FIG. 3 and terminates in an internally threaded section 178. A hollow needle 179 having a small, outside diameter suitable for reception in the blind bore 36 of the crystal 19 is threaded into the section 178 for supplying the fluid coolant 64 into the blind bore 36 of the laser crystal 19 and forming with the hollow, interior surface 153 of the spindle 61 and the inner surface 29 of the blind bore 36 the coolant return passageaway 71. At the upper end 123 of the spindle 61, a standard, leakproof coupler 181 may be provided between the rotating spindle 61 and the conduit 66 for coupling the passageway 71 to a pipe 182 to return the coolant 64 to the coolant supply device 44.

Referring to FIG. 1, the coolant supply device 44 may comprise a standard refrigeration system 184 for supplying the fluid coolant 64 under the control of a solenoid valve 186 through the supply pipe 176 to the conduit 66 at a temperature suitable for maintaining the laser crystal 19 at a desired operating temperature. More particularly, as stated by A. Yariv and J. P. Gordon in an article entitled "The Laser," published in the January 1963 issue of the Proceedings of the IEEE, volume 51, No. 1, page 13, a suitable operating temperature for the ruby laser crystal 19, when emitting the beam 12 of light radiation 52 at a wavelength of 0.6934 micron, is 77° K. Thus, nitrogen, which is liquid at a temperature of 77° K., is suitable for cooling the laser crystal 19.

The refrigeration system 184 supplies the fluid coolant 64 to the supply pipe 176 connected to the conduit 66 for passage into the blind bore 36 of the laser crystal 19. The fluid coolant 64 is heated by the laser crystal 19 as the fluid coolant 64 is urged against the surface 29 of the blind bore 36 and out of the blind bore 36 into the passageway 71. The fluid coolant 64 flows through the passageway 71, the coupler 181 and the pipe 182 for return to the refrigeration system 184.

An alternate coolant supply device 191 (FIG. 6) for feeding or supplying the fluid coolant 64, such as liquid nitrogen, to maintain the crystal at a suitable operating temperature, such as 77° K., may include a tank (not shown) containing gaseous nitrogen. The tank supplies gaseous nitrogen through a conduit 192 into an insulated container 193 having liquid nitrogen 194 therein. The pressure of the gaseous nitrogen forces the liquid nitrogen 194 out of the container 193 into a insulated conduit 196 under the control of a valve 197. The insulated conduit 196 supplies the liquid nitrogen 194 to a reservoir 198. Gaseous nitrogen supplied from a conduit 199 to the reservoir 198 is effective to force the liquid nitrogen 194 out of the reservoir 198 into the coolant supply pipe 176. The solenoid valve 186 is provided in the coolant supply pipe 176 for controlling the flow rate of the liquid nitrogen 194 supplied through the conduit 176.

Referring to FIGS. 2c and 3, the solenoid valve 186 is controlled in response to the operating temperature of the laser crystal 19 to maintain a selected flow rate of the liquid coolant 64. More particularly, the operating temperature of the laser crystal 19 is monitored by a thermocouple 201 provided on the lower end 151 of the spindle 61 adjacent to the opening 152. Because of the proximity of a temperature sensing element 202 of the thermocouple 201 to the laser crystal 19, the temperature sensed thereby is substantially the same as and, hence, provides an accurate indication of the temperature of the laser crystal 19. A retaining ring 203 may be provided for securing the element 202 to the spindle 61. Oppositely disposed conductors 204 secured to the spindle 61 conduct a signal 205 generated by the element 202 to a slip ring 206 and a brush 207 which apply the signal 205 to a cable 208. The cable 208 may be connected to a temperature control circuit 209 (FIG. 1). The temperature control circuit 209 responds to the signal 205 generated by the element 202 of the thermocouple 201 according to the temperature of the laser crystal 19, and energizes the solenoid valve 186. The solenoid valve 186 is operated by the control circuit 209 for controlling the rate of flow of the fluid coolant 64, such as the liquid nitrogen 194, to the blind bore 36 of the laser crystal 19 to maintain the laser crystal at the predetermined operating temperature.

*Operation*

In the operation of the laser device 11, the laser crystal 19 is press fit into the opening 152 of the spindle 61 and sealed therein by the ring seal 156. Fluid coolant 64 is applied through the conduit 176 and the needle 179 into the cavity 27 of the laser crystal 19 such as by operating the alternate coolant supply device 191. Upon flow of the fluid coolant 64 into the cavity 27, the lower end 151 of the spindle 61 is cooled and contracts around the laser crystal 19 to securely hold the laser crystal 19 in the opening 152. The heated gas is supplied through the bores 117–117 and 168 to prevent freezing of the ball bearing 114 and frosting of the surface 22 of the laser crystal 19. The drive mechanism 62 is then actuated for rotating the laser crystal 19 on the second focal line 59 at a predetermined speed so that the fluid coolant 64 is urged and flows outwardly into intimate contact with the inner surface 29 of the wall 28 of the cavity 27 and then upwardly along the inner surface 29. The fluid coolant 64 flows out of the cavity 27, through the passageway 71 and through the coupler 181 to the coolant return pipe 182 for return to the coolant supply device 191.

Concomitantly with actuation of the drive mechanism 62, the xenon flash lamp 82 is energized to render the inner reflective surface 47 effective to focus the line of light 56 onto the outer surface 22 of the laser crystal 19. The laser crystal 19 is thereby conditioned for laser operation and generates the beam 12 of coherent, monochromatic light. The beam 12 passes through the window 161 of the enclosure 46 and is focused onto the article 63 for processing the article.

During the operation of the laser device 11, the temperature sensing element 202 is effective to generate the signal 205 which is indicative of the operating temperature of the laser crystal 19. In response to the signal 205, the temperature control circuit 209 compares the indicated temperature to a desired temperature. To eliminate differences between the compared temperatures, the temperature control circuit 209 operates the solenoid valve 186 to regulate the flow rate of the fluid coolant 64 into the conduit 176.

The temperature control circuit 209 may provide an additional laser crystal temperature-controlling function by regulating the output of the variable-output power supply 132 (FIG. 5), so that both the speed of rotation of the laser crystal 19 and the flow rate of the fluid coolant 64 in the conduit 176 are adjusted to control the rate of flow of the coolant along the wall 28 of the cavity 27.

With the fluid coolant 64 flowing within the cavity 27 at the selected rate, the fluid coolant 64 does not diminish the flux density of the optical pumping radiation 52 applied to the outer surface 22 of the laser crystal 19, rendering greater efficiency possible. The high flow rate of the fluid coolant 64, which is controlled in response to the operating temperature of the laser crystal 19 and which results from rotation of the laser crystal 19, lessens the probability of forming coolant bubbles (not shown) within the cavity 27. If coolant bubbles are formed, the lighter density thereof permits the fluid coolant 64 having a greater density, to force the bubbles to the center of the cavity 27 where they do not interfere with heat transfer across the interface 68 (FIG. 3).

It is to be understood that the above-described arrangements are simply illustrative of the principles of the invention. Other arrangements may be devised by those skilled in the art which will embody the principles of the invention and fall within the spirit and scope thereof.

What is claimed is:
1. A laser device which comprises:
  an optical resonator having an axis of symmetry and an outer surface formed symmetrically with respect to the axis of symmetry,
  means for directing optical pumping radiation onto a selected area of said outer surface of the optical resonator, and
  means for rotating the optical resonator around the axis of symmetry to uniformly expose the outer surface of the optical resonator to said pumping radiation and preclude preferential lasing of the optical resonator.
2. A laser device comprising:
  a laser element having an axis of symmetry and an outer surface formed symmetrically with said axis,
  means for generating optical pumping radiation,
  means for focusing said optical pumping radiation at a selected area of said outer surface of said laser element,
  said laser element operating in a condition of preferential lasing in response to said optical pumping radiation on said selected area of said outer surface, and
  means for turning said laser element on said axis to uniformly expose the entire area of said outer surface to the focused optical pumping radiation to preclude said preferential lasing of said laser element and render said laser element operable in a condition of nonpreferential lasing.
3. A laser device which comprises:
  an optical resonator having an axis of symmetry and a cavity formed therein symmetrically with respect to said axis,
  a coolant received in the cavity and contacting the surface of said cavity, and
  means for rotating the resonator to establish a temperature differential across the interface between the coolant and the surface of the cavity contacted by the coolant to conduct heat from the resonator and cool the resonator.
4. A laser device which comprises:
  an optical resonator having an axis of symmetry and a cavity formed therein symmetrically with said axis;
  optical pumping means for exciting said optical resonator into said laser operation;

means for feeding coolant into said cavity; and means for spinning the optical resonator about said axis to render said optical pumping means effective to uniformly excite the optical resonator for non-preferential laser operation and to urge said coolant out of the cavity to dissipate heat generated by said optical resonator during said laser operation.

5. A laser device which comprises:

a laser element having an axis of symmetry, said laser element having a cavity formed partially therethrough symmetrically with respect to said axis;

means for exciting said laser element to render said laser element effective to emit said beam of light;

means for supplying a liquid coolant into the cavity;

means for rotating said laser element about said axis to force said fluid along the surface of said cavity and out of said cavity to dissipate heat from said laser element; and means responsive to the temperature of the laser element for controlling the supplying means to maintain said laser element at a predetermined operating temperature.

6. A laser device which comprises:

a crystal capable of laser operation, said crystal having an axis of symmetry, said crystal having an end surface formed symmetrically of said axis and an outer surface extending from said end surface symmetrically with respect to said axis, said crystal provided with a blind bore formed through said end surface coaxially of said axis;

means for applying optical pumping radiation directly onto said outer surface of the crystal to effect said laser operation;

hollow spindle means secured to the outer surfaces adjacent to the end surface for turning the crystal on said axis; and conduit means extending along said axis within the hollow spindle means to form an annular passageway, said conduit means supplying coolant to the bottom of said bore for advancement along the wall of said bore and into said passageway to maintain the crystal at a selected operating temperature.

7. A laser device which comprises:

a laser crystal having an axis and an outer surface formed symmetrically with respect to the axis, said laser crystal having an end surface and a bore formed through said end surface extending into said laser crystal symmetrically with said axis;

a hollow spindle secured to the outer surface of the laser crystal adjacent to said end surface to mount said laser crystal for rotation around said axis;

a light source for impinging pumping radiation onto the outer surface of said laser crystal to condition the laser crystal for laser operation;

a hollow needle extending along said axis substantially to the end of said bore;

means for feeding coolant through said needle to the end of said bore;

drive means for rotating said hollow spindle to rotate the laser crystal on said axis and render the wall of said bore effective to centrifugally flow said coolant along the wall and out of said bore to cool said crystal, said rotation of the laser crystal rendering said light source effective to impinge said pumping radiation uniformly onto said outer surface of said crystal;

means mounted on said spindle adjacent to the end surface of the laser crystal for monitoring the operating temperature of the laser crystal; and means responsive to the monitoring means for controlling the coolant feeding means and the drive means to maintain the laser element at a selected operating temperature.

8. Apparatus for cooling a laser crystal undergoing laser operation, said crystal being formed symmetrically with respect to an axis of rotation thereof and being provided with a bore formed coaxially of said axis, said apparatus comprising:

a spindle having a hollow interior for supporting said crystal with said bore in communication with the hollow interior, said spindle having a hub section formed thereon;

means for mounting said spindle for rotation;

belt drive means engaged to said hub section for rotating the spindle to turn said crystal on said axis of rotation;

a conduit extending into the hollow interior of said spindle;

a hollow needle secured to the conduit and extending into said bore of said crystal, said needle and said conduit forming in said respective bore and hollow interior an annular passageway concentric with said axis; and means for supplying liquid coolant through said conduit and said needle into said bore to render the rotation of said crystal effective to urge said coolant along the surface of said bore and through said passageway to cool said laser crystal.

9. A laser device, which comprises:

an optical reflector having first and second focal lines;

a light source mounted at said first focal line;

a laser crystal capable of laser operation, said laser crystal provided with an axis, an outer, cylindrical surface formed symmetrically with respect to the axis, and a bore formed partially therethrough coaxially of said surface;

a housing secured to said reflector in alignment with said second focal line, said housing having opposed cutout sections formed therein;

a tube depending from said housing between said cutout sections and extending into said reflector along an axis passing through said second focal line, said tube having first and second sections;

a hollow spindle mounted rotatably on said reflector and having a first portion thereof extending into said reflector for enclosing said first section of said tube, said spindle having a recessed section at the end of said portion to mount said laser crystal for rotation around said axis at second focal line with said second section of said tube extending into said bore, said spindle having a second portion thereof positioned between said cutout sections, said second portion being provided with a hub section;

means for feeding coolant through said tube into said bore of said crystal; and at least one driven belt extending through at least one of said cutout sections and around said hub section for rotating said spindle and said laser crystal around said axis to force said coolant out of said bore and cool said laser crystal.

10. A laser device, which comprises:

an enclosure provided with an interior reflective surface having first and second focal lines;

a spindle having a hub section provided at one end thereof and a recess formed in an opposite end thereof, said spindle being provided with an axis of symmetry extending between said ends;

support means secured to said enclosure to mount said spindle for rotation, said support means mounting said spindle with said opposite end within said enclosure, with said axis coincident with said second focal line, and with said hub section outside said enclosure;

a crystal capable of laser operation, said crystal having an axis of symmetry and an outer surface formed symmetrically with said axis, an end of said crystal being mounted in said recess of said spindle so that said axis of symmetry is coincident with said second focal line;

a source of optical pumping radiation mounted along said first focal line of said reflective surface and directing radiation onto said reflective surface for reflection onto said outer surface of said crystal; and drive means engaging said hub section for turning said spindle and said crystal on said respective axes of symmetry to uniformly expose the outer surface of said crystal to said optical pumping radiation reflected by said inner reflective surface.

11. A laser element comprising a crystal of material capable of laser operation, said crystal having an axis of symmetry, first and second spaced end surfaces, and an outer and inner surface formed symmetrically with respect to said axis, said outer surface extending between said first and second spaced end surfaces and said inner surface extending through said first end surface and partially through said crystal to define a blind bore.

12. A laser element according to claim 11 wherein said outer surface and said bore are cylindrical.

13. A method of precluding preferential lasing of a laser element having an axis of symmetry, which method comprises the steps of:

mounting said laser element with said axis in a selected orientation, generating optical pumping radiation, projecting said optical pumping radiation onto at least one selected area of said laser element from at least one direction to cause a section of said laser element to emit said coherent light radiation, and rotating said laser element on said axis for exposing the entire area of said laser element to said optical pumping radiation to preclude preferential lasing of said laser element.

14. A method of transferring heat from a laser element having an axis of symmetry, said laser element having a blind bore formed therein symmetrically with respect to said axis, which method comprises the steps of:

mounting said laser element with said axis in a selected orientation, generating optical pumping radiation, projecting said optical pumping radiation onto said laser element to cause said laser element to emit said coherent light radiation, feeding coolant substantially into said blind bore of said laser element, and rotating said laser element on said axis for causing the coolant to flow along the wall of said blind bore and transfer heat from the laser element.

References Cited

UNITED STATES PATENTS

| | | | |
|---|---|---|---|
| 3,102,920 | 9/1963 | Sirons | 331—94 |
| 3,222,615 | 12/1965 | Holly | 331—94 |

JEWELL H. PEDERSEN, *Primary Examiner.*

WILLIAM L. SIKES, *Assistant Examiner.*